3,107,705
MEANS FOR THE CONTROLLED DISPENSING
OF DRAFT BEER
Siegfried Gordon Isserstedt, 96 Poplar Plains Road,
Toronto, Ontario, Canada
Filed Mar. 13, 1961, Ser. No. 95,308
9 Claims. (Cl. 141—361)

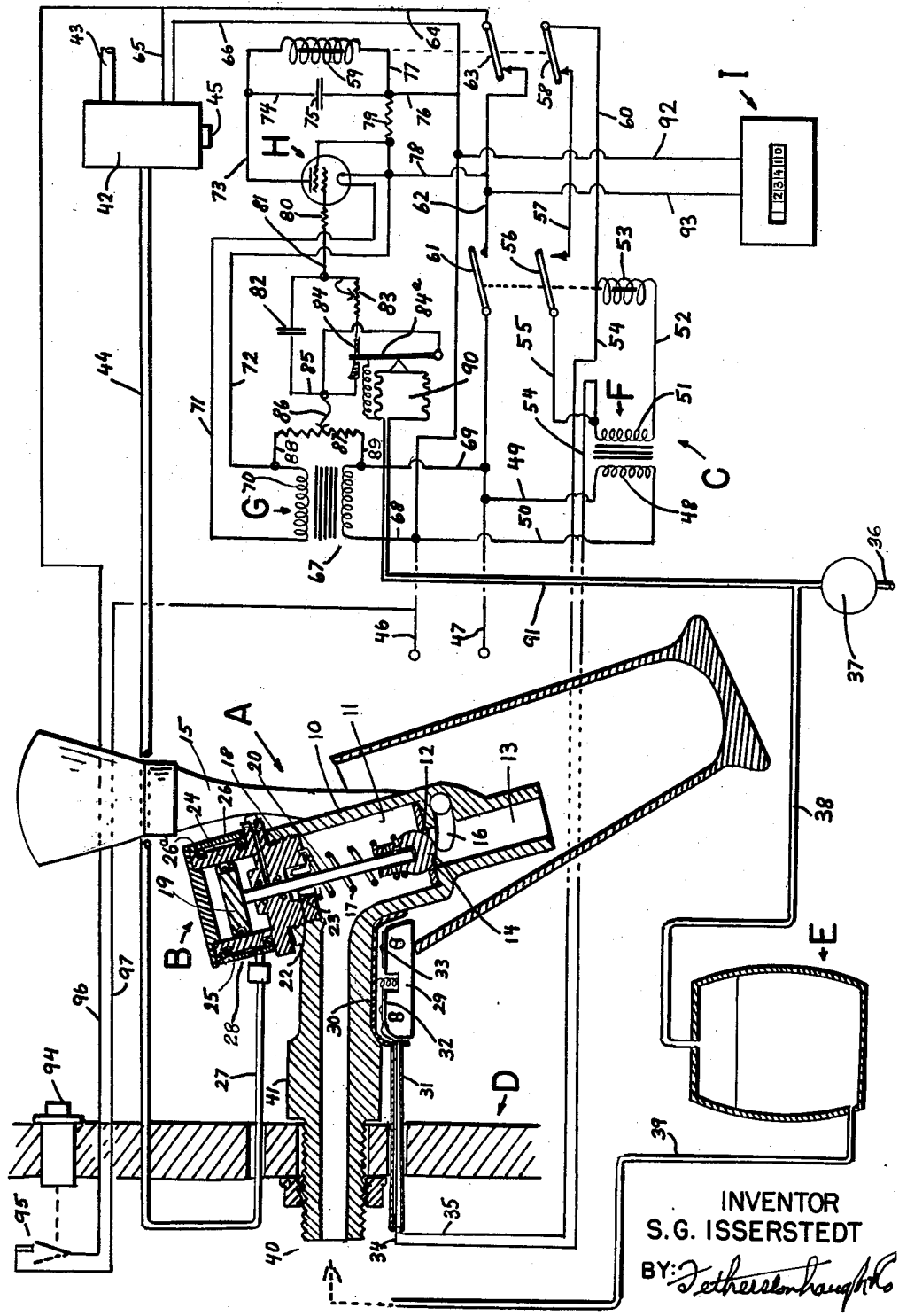

This invention relates to means for the controlled dispensing of draft beer.

Filling glasses with draft beer to a uniform level, without wastage and the proper amount of foam, requires skill. This is due mainly to the fact that draft beer, in order to remain fresh, has to be kept at pressures above 20 pounds per square inch and, due to its foaming characteristics, cannot be dispensed at a slow rate. Therefore, it is usual, in places where a substantial amount of draft beer is being sold, to employ a skilled tap man who will normally dispense more glasses of beer from a keg than a less skilled man.

Previously proposed methods for automatically filling beer glasses have not been practical or commercially successful due to the fact that beer is very sensitive to agitation, so that previously suggested measuring devices employing floats, special valves or anything which adds to disturb the free flow of beer are impractical of use. Furthermore, since draft beer is not pasteurized and is very sensitive to small impurities or bacteria growth, it is usual practice to clean the beer system nightly with water and weekly with chemicals, a service which is usually provided by the breweries. Consequently, it is undesirable, according to previous suggestion, to add additional or new type equipment into the beer line to be cleaned. Moreover, equipment previously suggested makes it necessary to replace the standard manually operated tap with other equipment, which is expensive to install, difficult to service, and does not permit manual dispensing of beer in the normal manner in case of power or equipment failure.

The invention overcomes these disadvantages by providing a simple, easy to install equipment which in no way increases the agitation of the beer, and which does not increase the difficulty of cleaning and servicing the beer system, but provides a much quicker and more accurate means for filling beer glasses without requiring "tap" skill.

It is a main object of the invention to provide a simple and accurate control means which when initiated by the operator will function to fill each glass when presented to the faucet with an accurately controlled predetermined amount of beer and foam.

It is a further object of the invention to provide a control means of this character by which the amount of foam created may be increased or decreased in relation to the foaming characteristics of the beer being dispensed.

It is a further object of the invention to provide a control means of this kind which may be associated with the dispensing faucet and which is initiated into action by a momentary touch of the rim of the glass of the beer being charged, when it surrounds the faucet spout, and which will permit the operator to vary the position of the glass in relation to the faucet during charging as to control foam characteristics of the glass being filled.

It is a further object of the invention to provide novel control mechanism which may be incorporated with a known type of beer dispensing faucet and which will provide for automatic dispensing while permitting the faucet to be used as a manual dispenser where this may be desired subject to the occasion.

It is a further object of the invention to provide a control circuit which will automatically compensate the timing in relation to the pressure of the beer system.

With these and other objects in view, the invention will be clearly understood by reference to the following detailed specification taken in conjunction with the accompanying drawing.

In the drawing:

The single FIGURE is a schematic partly sectional view of a beer dispensing faucet according to the present invention illustrating a glass engaging the control switch therefor and also illustrating the beer circuit and the electric control circuitry.

Referring to the drawing, A indicates a beer dispensing faucet having a tubular body 10 incorporating the bore 11, valve seat 12 and dispensing spout 13 which is of generally accepted standard construction. The spout employs a generally standard valve element 14 designed normally to be seated to shut off the spout 13 and this normal faucet employs an operating handle 15 which by means of an internally located lever 16 will engage the valve 14 to move it off its seat 12 against the pressure of a spring 17. This is all generally known construction with the exception that valve 14 in constructions generally employed telescopes on a fixed pin carried within the valve body and which is attached to the closure cap at the opposite end of bore 11, which cap is generally removable for cleaning purposes.

According to the present invention, the usual closure cap is eliminated and replaced by a closure cap B in the form of a cylinder which on its inner end is provided with a screw threaded nipple 18 adapted to be screwed into the end of bore 11 of body 10. This cylinder incorporates a piston 19 having the piston rod 20 which projects into the bore 11 and carries on its inner end the valve element 14 in such a manner as to permit slight play for the proper seating thereof. The valve element 14 and hence the piston rod 20 are normally urged in the direction of the valve seat 12 by means of a concentric coil spring 17 which at its upper end is anchored to the nipple 18 and at its lower end is anchored to the valve element 14 which has the effect of preventing the piston rod 20 from rotating during use which otherwise would promote possible consequent damage to the sealing diaphragm 22 which surrounds the piston rod 20 and seals it in the area of the cavity 23 in nipple 18.

The inner cylinder forming wall 24 of the cylinder B is encased by a cylindrical casing 25 which is disposed in spaced relation to wall 24 as to provide a circumferential air feeding channel 26, to which air is fed by means of the air supply line 27 when the piston is to be actuated. The air is transferred from the channel 26 through to the port 28 in wall 24, it being noted that the channel 26 is suitably sealed at each end by O-rings 26a as to provide an air-tight channel in the feeding circuit. It will be clear, therefore, that when air is supplied to the cylinder B via the feed line 27, it will cause the piston 19 to move from its normal position upwardly to open the valve.

The operation of the cylinder in this respect is controlled and timed so that each glass supplied to the faucet for filling will be filled with a corresponding uniform quantity of beer as will later appear.

This construction provides for a dual operation of the faucet as the air operated spring pressed piston is yieldable in a manner similar to the valve mechanism of the known manual faucet since the air cylinder is always vented when the valve is closed and consequently manual operation of the handle will readily cause the spring pressed piston to retract as the valve member is pressed inwardly by the lever 15 of the faucet handle. Moreover, this simple and effective unit makes it unnecessary to require the replacement of a faucet for installation of the control since it is only necessary to remove the normal closure cap on the upper end of the facuet and replace it with the removable cylinder unit B which functions as a closure cap and provides a combination which is particularly adapted to manual or automatic operation. Furthermore, by reason of the fact that no change is effected in the conventional faucet, the periodic cleaning operations necessary do not have to be varied from normal routine; whereas, since no additional parts are employed which could add to disturb the free flow of beer, it is obvious that beer may be dispensed under conditions of flow the same as prevail in the dispensing of beer as in the past. By employing a readily vented air cylinder as the valve actuator under automatic conditions and which also readily functions in the valve retraction under manual operation where necessary, it is evident that a quick closing valve combination is provided, necessary particularly in beer dispensing operations.

The location of switch 29 adjacent to and above the spout 13 is of importance as to make it necessary that the switch is actuated by the rim of the glass, as it is moved upwardly to surround the spout, before beer can be discharged whereby to assure efficient pouring thereof by locating the end of spout closely spaced to the bottom of the glass and avoid unnecessary agitation of the beer and which, therefore, can be caused to flow along the side of the glass. Depending on the existing foaming properties of the beer the operator can, once the flow is initiated by the switch 29, lower and raise the glass in relation to the stream from the faucet as to produce a desired foam on the beer when poured.

The operation of the cylinder B is controlled automatically by the electrical circuit C and which is initiated by the switch actuator 29 of the switch 30, the casing of which is positioned on the faucet A well above the lower end of the spout 13. The casing includes the metal conduit 31 which may readily be passed through an orifice in the panel D and rigidly secured thereto in any suitable manner as to maintain the switch in its mounted position. As noted, the switch is designed to be actuated by the rim of a glass being filled and which may be normally held at an angle as in manual serving so that the beer runs down the side of the glass for proper filling thereof. The switch 29 includes the contacts 32 and 33 connected to the lead 34 and either or both of which are adapted to contact with the casing 30 as to close a circuit through the conduit 31 which connects with the return lead 35 connected in the circuit C.

Before describing the operation of circuit C, reference is first of all made to the normal beer circuit. To the beer keg D, air under pressure is normally supplied by the feed line 36 controlled by the pressure regulator 37 and feeds via air lines 38 to keg E which contains the beer to be dispensed, and due to the air pressure supplied and the pressure of the beer, the beer is transferred via line 39 to discharge through the faucet A by way of the passage 40 in the faucet spigot 41 and which, as shown, communicates with the bore 11 of the faucet intermediate its ends. Consequently, when the faucet is opened, the beer is discharged through spout 13.

The circuit C is initiated by operation of the switch 29 and functions to actuate the solenoid valve 42 which is of known construction and acts to move the plunger thereof, on energization by the switch operation, to bring the air supply line 43 into communication with the feeder line 44 which terminates in air line 27 communicating with the piston B. Then this connection is maintained for a predetermined time as controlled by the circuit and when the circuit shuts off and the solenoid 42 is deenergized, the plunger thereof will retract to shut off communication between main feed line 43 and feeder 44 and place line 44 in communication with the exhaust 45. The circuit C is fed by the mains 46 and 47 from a suitable supply of 110 volt A.C. current. The primary winding 48 of the transformer F is connected with line 47 by the lead 49 and by lead 50 to line 46, as shown. The secondary 51 of transformer F supplies 6 volts, and is connected by lead 52 to the relay 53 which in turn, via the lead 54, is connected with lead 35 from switch 29. The opposite end of secondary 51 is connected via the lead 54a to the lead 34 of switch 29 and via the lead 55 to the relay holding contact 56 which, when closed by relay 53, establishes connection with the lead 57 through the normally closed contact 58 of relay 59, contact 58 being connected by the lead 60 to the opposite end of relay coil 53. Consequently, it will be understood that when switch 29 is momentarily initiated, relay 53 will cause contact 56 to close and, therefore, by means of holding contact 58 will remain closed until contact 58 is opened, by relay 59, which will be referred to hereinafter.

The operation of relay 53 as described also causes contact 61 to close and which through the lead 62 connects with contact 63 which is normally closed. Consequently, contact 61 is maintained closed until contact 58 is subsequently opened by relay 59 causing relay 53 to open. The closing of contact 61 establishes a circuit through the line 64 and line 65 to the solenoid 42 and the return 66 through to line 46 energizes the solenoid 42 as to supply air from main 43, as previously described, to the cylinder B of faucet A. The energization of this circuit is time controlled as to provide for the predetermined quantity of beer to be delivered by the faucet to the glass. The timing is minutely controlled in the following manner: the primary winding 67 of transformer G is connected by the leads 68 and 69, respectively, to the mains 46 and 47. The secondary winding 70 of transformer G supplies 6 volts to the screen grid tube H through the leads 71 and 72. The plate of tube H is connected via lead 73 to relay 59 and through leads 73 and 74 to the condenser 75 which is connected by lead 76 to the main 46. The relay 59 similarly is connected to main 56 via the lead 77. The screen grid of the tube and the cathode of the tube are connected by lead 78 to lead 62 and to main 47 if the contact 61 is closed. The lead line 78 is connected to lead 76 by way of a resistor 79. The grid of the tube is connected via a resistor 80 and lead 81 to condenser 82, on the one hand, and variable resistor 83, on the other, which in turn is connected with the variable resistor 84 and through lead 85 to condenser 82. Lead 85 is in turn connected to the centre tap 86 of resistor 87 which in turn is connected via lead 88 with secondary transformer lead 72 and via lead 89 with lead 69 of primary winding 67 of transformer G. It is through this last mentioned circuitry that the timing is controlled.

When current is supplied to the terminals of the mains 46 and 47, the cathode of tube H heats and sets up a cathode-grid electron current which charges condenser 82. Consequently, when relay 53 is energized by pushing the glass against switch 29, the filling operation starts through spout 13 because contact 61 is closed, thereby supplying current to solenoid valve 42 as previously described. The tube H cannot conduct plate current because its grid is held by a negative bias on condenser 82. This charge, however, leaks off through variable resistors 84 and 83, thereby reducing the grid bias on the tube. When the charge has fallen to a sufficiently low level, the tube grid is no longer at cut-off potential and the tube conducts closing relay 59. Accordingly, contact 63 is opened, thereby deenergizing solenoid 42 and consequently stopping the beer flow. This operation of relay 59 also opens contact 58 which in turn releases relay 51 and contacts 56 and 61, thereby deenergizing the circuit ready for operation when the switch 29 is next depressed.

When the resistance of variable resistances 83 or 84 is increased, it will of course take a longer time for condenser 82 to discharge. Accordingly, the timing will be increased and by this means, the glass can be filled to a higher level. Conversely, if the resistances 83 or 84 are decreased, the charge in condenser 82 will leak off faster and by this means the glass can be filled to a lower level. Accordingly, it will be clear that by adjustment of the variable resistances 83 and 84, the uniform quantity of beer supplied to the glass can be readily predetermined and controlled.

The variable resistor 83 provides a manual means of adjusting the level to which the glass is to be filled. However, it should be noted that if the pressure on the beer varies and which will result due to temperature changes or the setting and differential of the pressure regulator, the glass may be filled to a different level in terms of a given timing period and which, of course, would not always provide for uniform filling at each operation of the switch. However, this difficulty is obviated by the control circuit. In this instance, the slider 84a of the variable resistor 84 is actuated by means of a bellows 90 which is connected with the pressure branch pipe line 91, in turn connecting with pressure regulator 37 controlling the pressure in line 38. Accordingly, any variations in pressure above the beer are transmitted by the bellows 90 to the spring tension slider 84a. In result, therefore, the variable resistor 84 is regulated in accordance with pressure in line 38. It should be apparent that the bellows 90 expands as the pressure on top of the beer increases, thereby decreasing the resistance in variable resistance 84. Similarly, if the pressure above the beer decreases, the bellows 90 will collapse and in consequence, the spring tension slider will be actuated to increase the resistance in variable resistance 84. Accordingly, therefore, as explained previously, if the resistance of variable resistance 84 increases, for instance due to a drop in pressure, the timing cycle is lengthened and, therefore, the beer valve will stay open longer. Similarly if the pressure above the beer rises, the resistance 84 will be decreased, thus shortening the filling cycle. It will also be seen that if variable resistance 84 is properly selected, the glass will always fill to the same level even though the pressure above the beer varies, i.e., if the pressure is lower, the valve has to stay open longer and when the pressure is higher, the valve has to stay open a shorter period of time and the operation of the bellows and the variable resistance performs this operation automatically.

The control circuit also incorporates a means of registering the number of glasses of beer served during any given period of operation so that the owner has control over the exact quantity served. For this purpose, valve A incorporates a lock (not shown) which normally locks handle 15 so that it may only be used when the owner desires as, for instance, if there was a failure in the electrical supply. Consequently, with handle 15 locked the only means of dispensing is through switch 29 controlled by circuit C. Accordingly, by incorporating the electrically operated numerical counter I in circuit C by means of the leads 92 and 93 connected, respectively, with the mains 46 and 47, each glass of beer drafted is recorded on recorder I which can be conveniently located in the owner's office.

It should be understood clearly that the circuit C is initiated merely by momentarily touching switch 29 with the rim of the glass being filled. Consequently, the bartender has free control of the glass and can move it towards and away from the faucet as may be required, thereby promoting a desired amount of foam in the glass being filled. However, if due to the delay of the waiter, in serving, the filled glass stands for a few moments and in consequence the filled glass decreases in or loses its foam, provision is made for freshening it in this respect. This is achieved by a manually operable push-button switch 94 conveniently carried on panel D. This actuates the switch element 95 which is a snap switch making only momentary contact on depression of button 94. The elements of switch 95 are connected, respectively, by the leads 96 and 97 with the mains 46 and 47 as clearly illustrated in the diagram. Accordingly, the bartender in such a case may press this switch while holding the glass below the faucet and since there is always pressure within the bore 11 of the faucet, a slight momentary opening of valve 14 will squirt a small quantity of foamy beer into the top of the glass, thus refreshing it. Pressing of the switch 94 does not affect the counter I and, of course, by reason of the fact that the switch is a monetary snap switch, it cannot be used for filling purposes.

Apart from the minute control provided by the circuit C as described and which provides for use of successive glasses in predetermined quantity regardless of variation in pressure on the beer, it should be noted that the valve control unit for the faucet is of particularly simple character and such that it can be applied to standard taps presently used without any alteration therein and, of course, the same applies in respect of the addition of switch 29. Consequently, with this very simple alteration, a standard beer faucet can be rendered one of automatic character and without interfering with normal processing such as cleaning, etc. This is all particularly important because due to the character of the product being dispensed, it is necessary that the lines be kept clean and it is usual for the beer supplier to initiate a regular cleaning service and in this case, it is only necessary to remove the unit B as compared to the previous cap employed and since the valve 14 is of the same character, there is no difference in maintenance. By the same token, installation of the automatic equipment is relatively economic since it is merely a case of adding the unit B and the switch 29 to faucets already in use and which completely eliminates the necessity of having special faucets installed.

What I claim as my invention is:

1. Means for controlled dispensing of draft beer subject to foam producing characteristics as it is dispensed comprising a faucet having an axial bore therethrough, a discharge spout at its lower end, a beer supply passage communicating with said bore intermediate its extent, a valve seat in said bore, a cylinder having a piston therein and a piston rod projecting from one end thereof, said end of said cylinder forming a closure for the opposite end of said bore to cause said piston rod to project therewithin concentrically aligned with said spout, a valve element on the end of said piston rod engageable with said valve seat, spring means normally urging said rod towards said valve seat normally to interrupt communication between said spout and said bore, air pressure supply means communicating with said cylinder for moving said piston whereby to lift said valve element off said seat, a switch on said faucet engageable by a rim of a glass to be filled, when surrounding said spout, a circuit connected with said switch, means in said circuit controlling an air pressure supply to said cylinder, and control means in said circuit initiated by momentary contact of said switch for maintaining said valve open over a time period required for filling said glass to a predetermined level whereby the user may retract the glass from said faucet to desired extent during said time period as to increase or decrease the amount of foam produced when said glass is filled.

2. Means for controlled dispensing of draft beer as claimed in claim 1 in which said circuit includes control means variable in response to variation of pressure on said beer for varying the discharging time period of said beer from said faucet whereby each glass of beer drafted will be filled to a corresponding level regardless of such beer pressure variations.

3. Means for controlled dispensing of draft beer as claimed in claim 2 in which said variable control means includes a screen grid tube, a condenser charged thereby and two series connected variable resistors through which said charge leaks off over a predetermined time, set by one of said variable resistors, a solenoid valve in said circuit, controlling said air supply means to said cylinder, retained in open air supplying position when said condenser retains its charge, and a pressure responsive diaphragm connected to air pressure supply means for said beer and operatively connected to a variable slider controlling the other variable resistor for varying its resistance in relation to variation in said air pressure supply for said beer, thereby varying resistance included in said circuit and the time period over which said condenser is discharged.

4. Means for controlled dispensing of draft beer subject to foam producing characteristics as it is dispensed comprising a dual operating faucet having an axial bore therethrough, a discharge spout at its lower end, a beer supply passage communicating with said bore intermediate its extent, a valve seat in said bore adjacent said spout, a valve normally closing said seat, a cylinder having a piston therein and a piston rod projecting from one end thereof, said end of said cylinder forming a closure for the opposite end of said bore, said valve being carried on the end of said piston rod, spring means normally urging said valve towards said valve seat, a manually swingable handle mounted on said faucet including lever means within said faucet engageable with said valve for levering it open against said spring control, normally vented, air pressure supply means communicating with said cylinder, for moving said piston to lift said valve from its seat, a switch on said faucet body above the lower end of said spout and engageable by a glass to be filled as it registers with said spout, a circuit connected with said switch, means in said circuit controlling supply of air pressure to said cylinder and control means in said circuit, initiated by momentary contact of said switch, for maintaining said valve open for a time period required for filling said glass to the predetermined level, whereby the user may retract the glass from said faucet to a desired extent, during said time period, as to increase or decrease the amount of foam produced when said glass is filled.

5. In means for the controlled dispensing of draft beer subject to foam producing characteristics as it is dispensed, a faucet having a bore therethrough terminating in a spout at one end, a valve element controlling communication between said bore and said spout and a removable closure member at the opposite end of said faucet, said closure member comprising a cylinder, a union member on one end thereof for detachably entering said bore, a piston in said cylinder having a piston rod projecting concentrically through and beyond said union member and terminating in a free end, said valve element being carried on the free end of said rod, spring means normally urging said rod axially outward of said cylinder, a port in said cylinder adjacent the inner end thereof for passage therethrough of air under pressure to actuate said piston, and means located adjacent to said faucet and above the lower end of said spout, engageable by the rim of a glass when moved upwardly to surround said spout for initiating supply of air to said cylinder.

6. In means for the controlled dispensing of draft beer subject to foam producing characteristics as it is dispensed including a faucet having a bore therethrough terminating in a spout at one end, a removable closure at the other end and a valve seat in said bore adjacent to said spout, said closure member comprising an air cylinder, a union nipple on one end thereof for detachably securing said cylinder to said faucet so that said end of said cylinder closes said bore, a piston in said cylinder having a piston rod projecting concentrically through and beyond said union nipple and terminating in a free end, a valve member on said free end of said rod for engagement with the faucet seat, a coil spring encircling said rod and urging said valve axially outward of said cylinder, a sealing diaphragm carried by said rod and engaging a wall of said nipple in sealing engagement, said spring being anchored at one end to said nipple and at the other to said valve to restrain said rod from rotatable movement as to impose torsional forces on said diaphragm, and a port in said cylinder for passage of air thereto to actuate said piston rod in one axial direction against the spring applied force directed in the opposite axial direction.

7. In means for the controlled dispensing of draft beer a faucet having a bore therethrough terminating in a spout at one end, a valve element controlling communication between said bore and said spout and a removable closure member at the opposite end of said faucet, said closure member comprising a cylinder, a union member on one end thereof for detachably entering said bore, a piston in said cylinder having a piston rod projecting concenttrically through and beyond said union member and terminating in a free end, said valve element being carried on the free end of said rod, spring means normally urging said rod axially outward of said cylinder, and a port in said cylinder adjacent the inner end thereof for passage therethrough of air under pressure to actuate said piston; including a cylindrical casing surrounding said cylinder and forming therebetween an annular chamber, means at opposite ends of said chamber for sealing it, said inlet port communicating with said annular passage and a port in said cylindrical casing for delivery of fluid under pressure to said annular chamber.

8. Means for controlled dispensing of draft beer subject to foam producing characteristics as it is dispensed, comprising a faucet having an axial bore therethorugh, a discharge spout at its lower end, a beer supply passage communicating with said bore intermediate its extent, a valve seat in said bore, a cylinder having a piston therein and a piston rod projecting from one end thereof, said end of said cylinder forming a closure for the opposite end of said bore to cause said piston rod to project therewithin concentrically aligned with said spout, a valve element on the end of said piston rod engageable with said valve seat, spring means normally urging said rod towards said valve seat normally to interrupt communication between said spout and said bore, air pressure supply means communicating with said cylinder for moving said piston whereby to lift said valve element off said seat, a switch on said faucet engageable by a rim of a glass to be filled, when surrounding said spout, a circuit connected with said switch, means in said circuit controlling an air pressure supply to said cylinder, and control means in said circuit initiated by momentary contact of said switch for maintaining said valve open over a time period required for filling said glass to a predetermined level whereby the user may retract the glass from said faucet to desired extent during said time period as to increase or decrease the amount of foam produced when said glass is filled; including a manually operable snap switch in said circuit adapted to make one momentary contact when actuated, said switch momentarily operating said circuit to cause said faucet to eject a small charge of foamy beer to freshen the pre-charged glass.

9. In means for the controlled dispensing of draft beer, a faucet having a bore therethrough terminating in a spout at one end, a valve element controlling communication between said bore and said spout and a removable closure member at the opposite end of said faucet, said closure member comprising a cylinder, a union member on one end thereof for detachably entering said bore, a piston in said cylinder having a piston rod projecting concentrically through and beyond said union member and terminating in a free end, said valve element being carried on the free end of said rod, spring means normally urging said rod axially outward of said cylinder, and a port in said cylinder adjacent the inner end thereof for passage therethrough of air under pressure to actuate said piston, wherein a sealing diaphragm surrounds said piston rod and seals the end of said union member, and means for restraining said piston rod from rotation as to avoid distortion of said diaphragm.

References Cited in the file of this patent

UNITED STATES PATENTS

| | | |
|---|---|---|
| 1,149,256 | Godfrey | Aug. 10, 1915 |
| 2,320,011 | Reynolds | May 25, 1943 |
| 2,462,019 | Bowman | Feb. 15, 1949 |
| 2,602,576 | Spruck | July 8, 1952 |
| 2,658,645 | Harris | Nov. 10, 1953 |
| 2,663,477 | Bendz | Dec. 22, 1953 |
| 2,845,964 | Harland | Aug. 5, 1958 |
| 2,868,247 | Weisberg et al. | Jan. 13, 1959 |
| 2,872,075 | Steiner | Feb. 3, 1959 |
| 2,929,417 | Mosher | Mar. 22, 1960 |
| 2,929,535 | Fairbanks | Mar. 22, 1960 |